US012155140B2

(12) United States Patent
Asano et al.

(10) Patent No.: US 12,155,140 B2
(45) Date of Patent: Nov. 26, 2024

(54) CONNECTOR DEVICE WITH PLURALITY OF MOVABLE OUTER CONDUCTORS BEING ELECTRICALLY CONDUCIVE WITH EACH OTHER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Yutaka Kobayashi, Mie (JP); Yorikazu Murabayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 286 days.

(21) Appl. No.: 17/775,005

(22) PCT Filed: Oct. 23, 2020

(86) PCT No.: PCT/JP2020/039868
§ 371 (c)(1),
(2) Date: May 6, 2022

(87) PCT Pub. No.: WO2021/095485
PCT Pub. Date: May 20, 2021

(65) Prior Publication Data

US 2022/0368051 A1 Nov. 17, 2022

(30) Foreign Application Priority Data

Nov. 13, 2019 (JP) ................................ 2019-205755
Mar. 13, 2020 (JP) ................................ 2020-044402

(51) Int. Cl.
*H01R 12/91* (2011.01)
*H01R 13/631* (2006.01)

(52) U.S. Cl.
CPC .......... *H01R 12/91* (2013.01); *H01R 13/631* (2013.01)

(58) Field of Classification Search
None
See application file for complete search history.

(56) References Cited

U.S. PATENT DOCUMENTS 8,801,459 B2 8/2014 Mrowka
2018/0301829 A1* 10/2018 Hoyack ............... H01R 13/658
(Continued)

FOREIGN PATENT DOCUMENTS

DE 10057143 A1 6/2002
JP H04-135186 U1 12/1992
JP 2016-100190 A 5/2016

OTHER PUBLICATIONS

International Search Report issued on Dec. 15, 2020 for WO 2021/095485 A1 (4 pages).

*Primary Examiner* — Oscar C Jimenez
(74) *Attorney, Agent, or Firm* — Venjuris, P.C.

(57) ABSTRACT

It is aimed to improve grounding performance. A connector device is provided with a plurality of first terminal units to be mounted on a first circuit board, a plurality of second terminal units to be mounted on a second circuit board and a plurality of movable terminal units. The first terminal unit includes a first outer conductor surrounding a first inner conductor. The second terminal unit includes a second outer conductor surrounding a second inner conductor. The movable terminal unit includes a movable outer conductor surrounding a movable inner conductor. The movable terminal unit is swingable with the second terminal unit as a fulcrum. A tip part of the movable terminal unit is connect-
(Continued)

able to the first terminal unit. The plurality of movable outer conductors are electrically conductively connected via an alignment member serving as a connecting member.

8 Claims, 14 Drawing Sheets

(56) References Cited

U.S. PATENT DOCUMENTS

| | | | | | |
|---|---|---|---|---|---|
| 2022/0393410 | A1* | 12/2022 | Asano | ..................... | H01R 24/38 |
| 2022/0393411 | A1* | 12/2022 | Asano | ..................... | H01R 24/54 |
| 2022/0399683 | A1* | 12/2022 | Asano | ................ | H01R 13/6315 |
| 2023/0094904 | A1* | 3/2023 | Asano | ..................... | H01R 12/91<br>439/247 |
| 2023/0163498 | A1* | 5/2023 | Asano | ..................... | H01R 24/50<br>439/66 |
| 2023/0163538 | A1* | 5/2023 | Asano | ..................... | H01R 24/44<br>439/578 |

* cited by examiner

CONNECTOR DEVICE WITH PLURALITY OF MOVABLE OUTER CONDUCTORS BEING ELECTRICALLY CONDUCIVE WITH EACH OTHER

CROSS REFERENCE TO RELATED APPLICATIONS

This application is a national phase of PCT application No. PCT/JP2020/039868, filed on 23 Oct. 2020, which claims priority from Japanese patent application Nos. 2019-205755 and 2020-044402 filed on 13 Nov. 2019 and 13 Mar. 2020, respectively, all of which are incorporated herein by reference.

TECHNICAL FIELD

The present disclosure relates to a connector device.

BACKGROUND

Patent Document 1 discloses a connector device including a first connector and a second connector facing each other and configured to connect the both connectors via an adaptor. Even if the first and second connectors are positionally deviated in a direction intersecting a facing direction, positional deviations of the both connectors are absorbed by the inclination of the adaptor. The first connector includes a first outer conductor surrounding a first inner conductor and the second connector includes a second outer conductor surrounding a second inner conductor. The adaptor includes a movable outer conductor surrounding a movable inner conductor. The first and second outer conductors are connected to a ground circuit while being electrically conductive with each other via the movable outer conductor.

PRIOR ART DOCUMENT

Patent Document

Patent Document 1: U.S. Pat. No. 8,801,459

SUMMARY OF THE INVENTION

Problems to be Solved

The following problem may occur in the case of applying the above connection structure for connecting the first and second connectors via the adaptor to a multipole connector device. In the case of reducing the size of the connector device, intervals between adaptors become narrower. Thus, if a potential difference is produced between adjacent ones of the movable outer conductors, grounding performance may be reduced.

A connector device of the present disclosure was completed on the basis of the above situation and aims to improve grounding performance.

Means to Solve the Problem

The present disclosure is directed to a connector device with a plurality of first terminal units to be mounted on a first circuit board, a plurality of second terminal units to be mounted on a second circuit board, and a plurality of movable terminal units, wherein the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is swingable with the second terminal unit as a fulcrum, a tip part of the movable terminal unit is connectable to the first terminal unit, and the plurality of movable outer conductors are electrically conductively connected via a connecting member.

Effect of the Invention

The connector device of the present disclosure is excellent in grounding performance.

DETAILED DESCRIPTION TO EXECUTE THE INVENTION

Description of Embodiments of Present Disclosure

Figure 1:
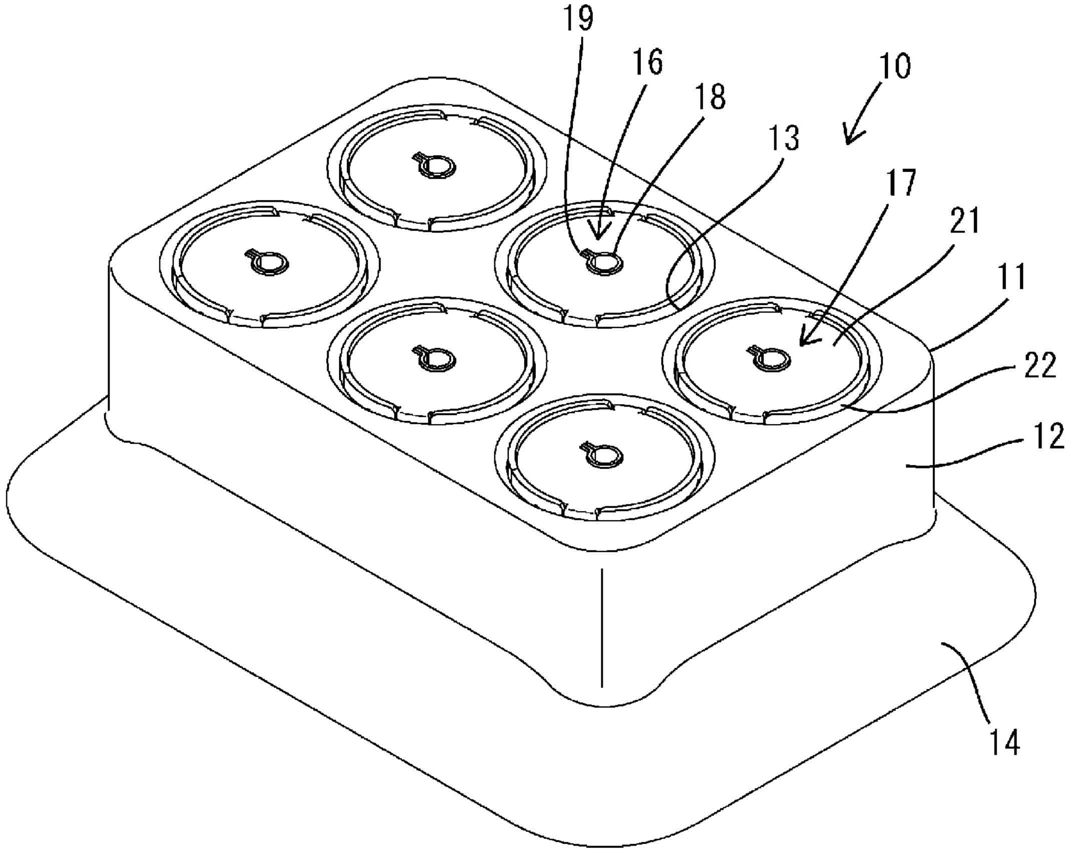
FIG. 1 is a perspective view of a first connector.

First, embodiments of the present disclosure are listed and described.

(1) The connector device of the present disclosure is provided with a plurality of first terminal units to be mounted on a first circuit board, a plurality of second terminal units to be mounted on a second circuit board, and a plurality of movable terminal units, wherein the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is swingable with the second terminal unit as a fulcrum, a tip part of the movable terminal unit is connectable to the first terminal unit, and the plurality of movable outer conductors are electrically conductively connected via a connecting member. According to the configuration of the present disclosure, since the plurality of movable outer conductors are electrically conductive with each other via the connecting member, no potential difference is produced among the plurality of movable outer conductors. Therefore, grounding performance is excellent.

(2) Preferably, the connecting member includes a resilient contact piece configured to resiliently contact the movable outer conductor. According to this configuration, the connecting member and the movable outer conductor can be reliably held in contact.

(3) In (2), preferably, the resilient contact piece is shaped to extend along an outer periphery of the movable outer conductor. According to this configuration, since the resilient contact piece flexibly follows a movement of the movable terminal unit when the movable terminal unit is displaced in a radial direction, a contact state of the connecting member and the movable outer conductor is stabilized.

(4) Preferably, the connecting member includes a plurality of hole portions, the plurality of movable terminal units being individually passed through the hole portions. According to this configuration, regardless of in which direction the movable terminal unit swings, the movable terminal unit is not separated from the connecting member.

(5) Preferably, the connecting member includes a contact portion configured to contact the movable terminal unit with a non-fracture surface. According to this configuration, it can be prevented that the movable outer conductor is damaged by a fracture surface of the connecting member.

(6) Preferably, the plurality of second terminal units are held in a housing, and the connecting member and the housing include holding portions for holding the connecting member in a state mounted on the housing. According to this configuration, handling becomes easier since the connecting member and the housing can be held in a mounted state.

(7) In (6), preferably, the holding portion on the connecting member side and the holding portion on the housing side have facing surfaces facing each other in a direction intersecting a displacement direction of the connecting member when the movable terminal unit swings, and the facing surface on the connecting member side and the facing surface on the housing side are kept positioned to face each other when the connecting member is in a range where a displacement is allowed. According to this configuration, the connecting member can be displaced even without resiliently deforming the holding portions when the movable terminal unit swings.

(8) In (1), preferably, the plurality of second outer conductors are fixed to a housing, the plurality of movable outer conductors are individually in electrically conductive contact with the plurality of second outer conductors, and the connecting member is in electrically conductive contact with the plurality of second outer conductors. According to this configuration, since the second outer conductors to be contacted by the connecting member are fixed to the housing, the contact reliability of the connecting member and the second outer conductors is high. Since potential differences among the plurality of second outer conductors are eliminated in this way, the plurality of movable outer conductors can be reliably held at the same potential.

(9) In (1), preferably, the plurality of movable outer conductors are individually in electrically conductive contact with the plurality of second outer conductors, and the plurality of second outer conductors constitute a single component integrated via the connecting member. According to this configuration, since the plurality of second outer conductors constitute the signal component, no potential different is produced among the second outer conductors and the plurality of movable outer conductors can be reliably held at the same potential.

Details of Embodiments of Present Disclosure

First Embodiment

Figure 2:
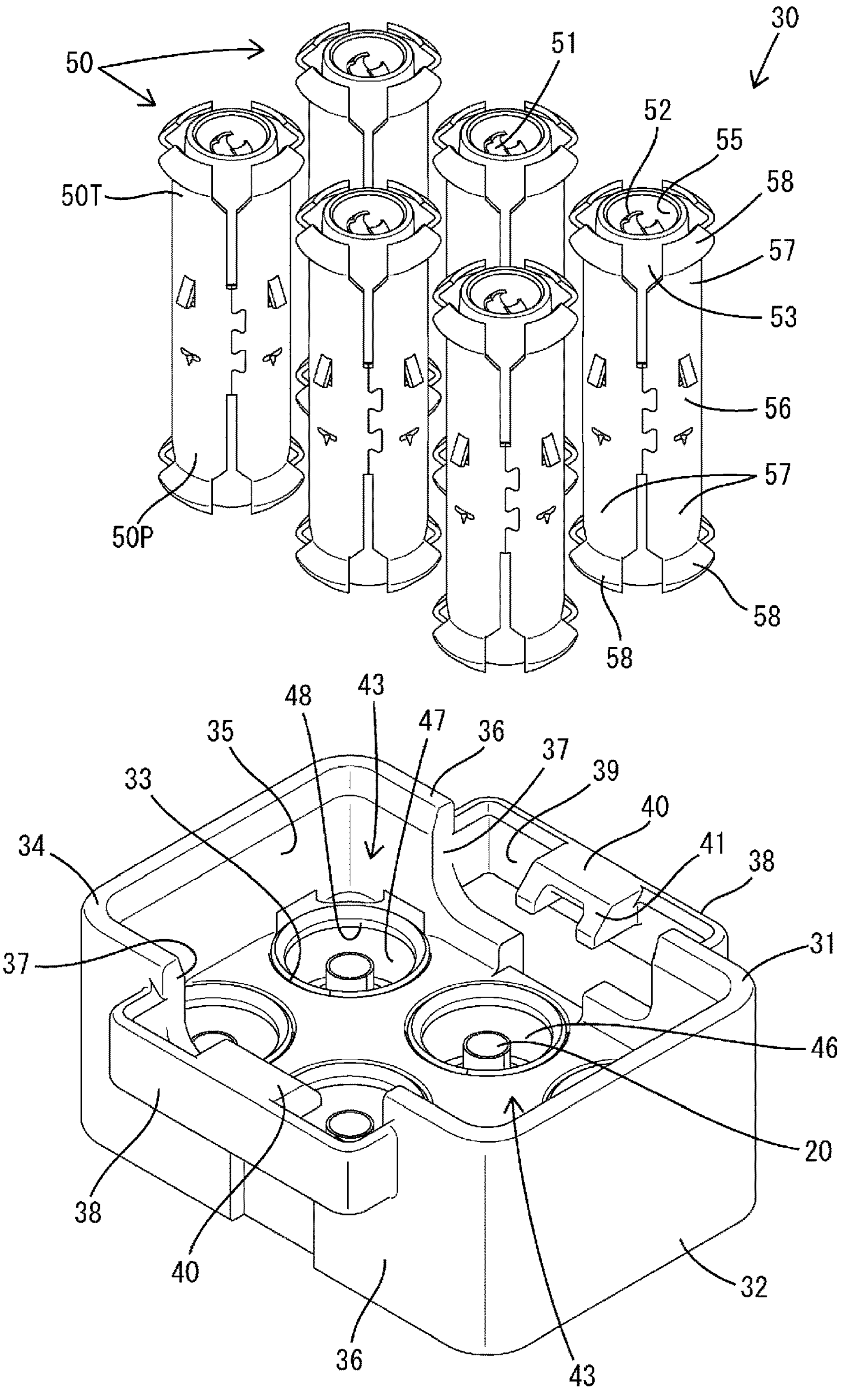
FIG. 2 is a perspective view showing a state where movable terminal units adaptors are separated in a second connector.
Figure 3:
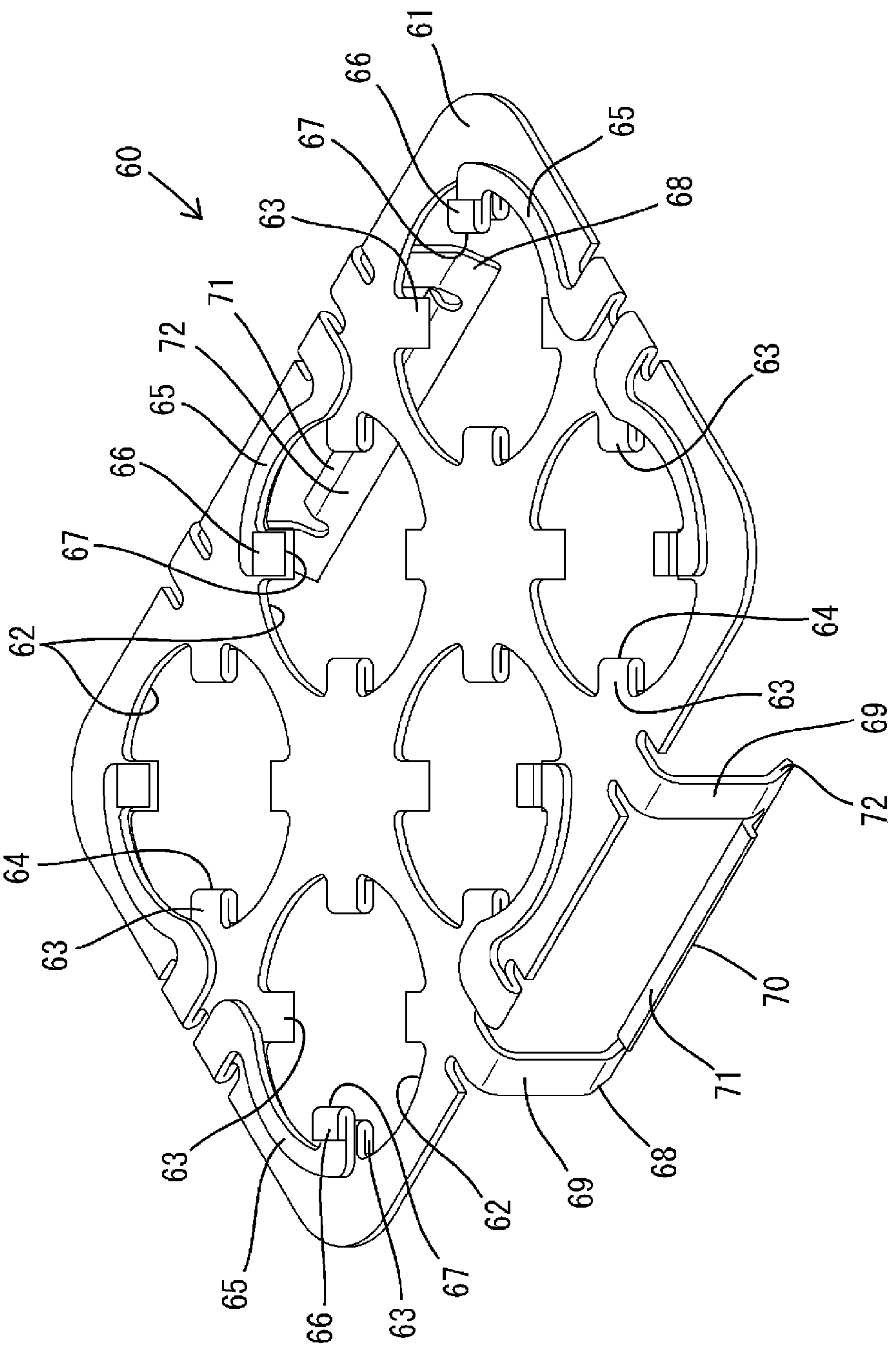
FIG. 3 is a perspective view of an alignment member a connecting member.
Figure 4:
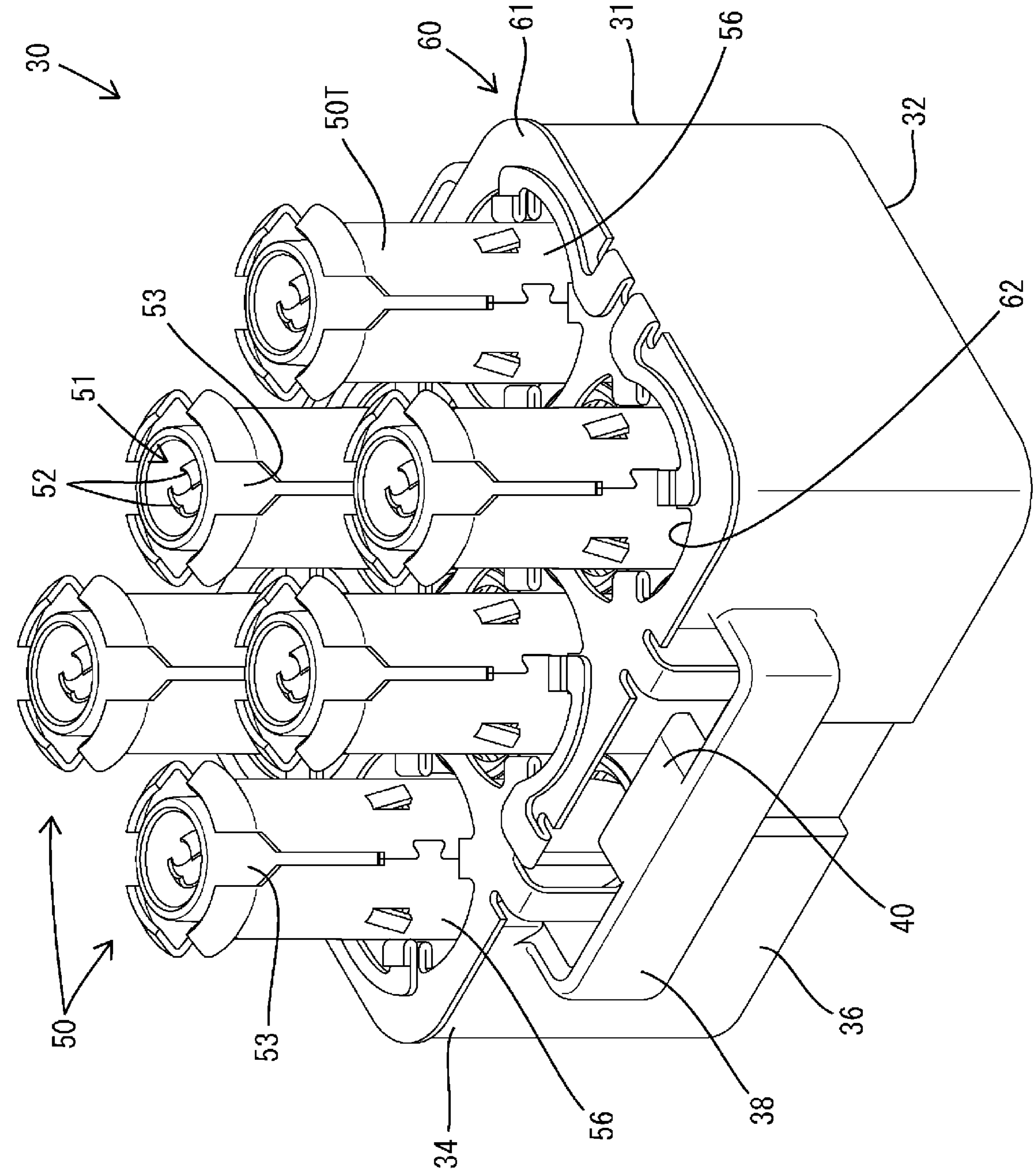
FIG. 4 is a perspective view of the second connector.

A specific embodiment of a connector device A of the present disclosure is described with reference to FIGS. 1 to 8. Note that the present invention is not limited to these illustrations and is intended to be represented by claims and include all changes in the scope of claims and in the meaning and scope of equivalents. In this embodiment, an oblique right-lower side in FIGS. 1 to 3 is defined as a front side concerning a front-rear direction. Upper and lower sides shown in FIGS. 1 to 6 and 8 are directly defined as upper and lower sides concerning a vertical direction. An oblique left-lower side in FIGS. 1 to 3 is defined as a left side concerning a lateral direction.

Figure 8:
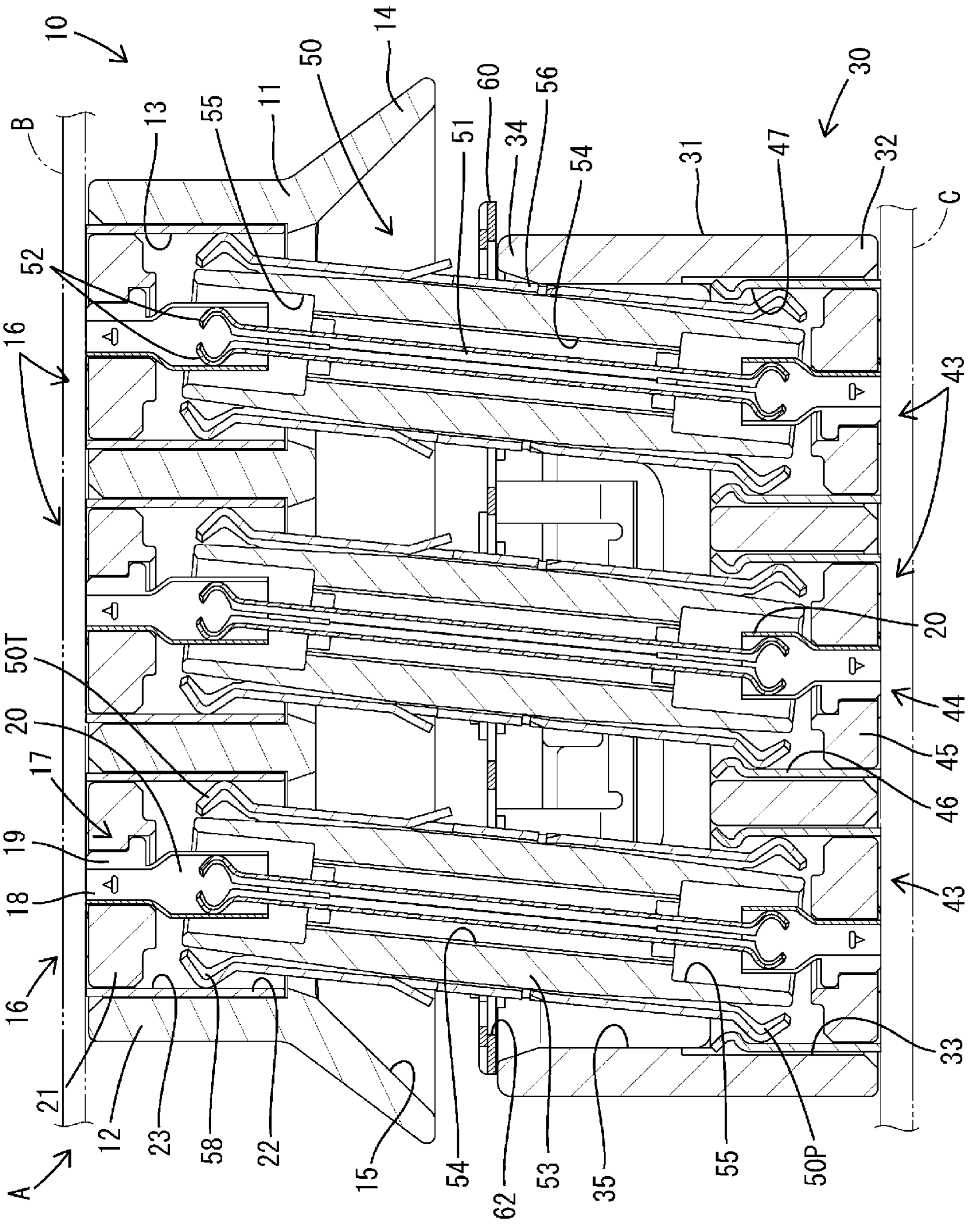
FIG. 8 is a front view in section showing a state where the first and second connectors are connected.
Figure 9:
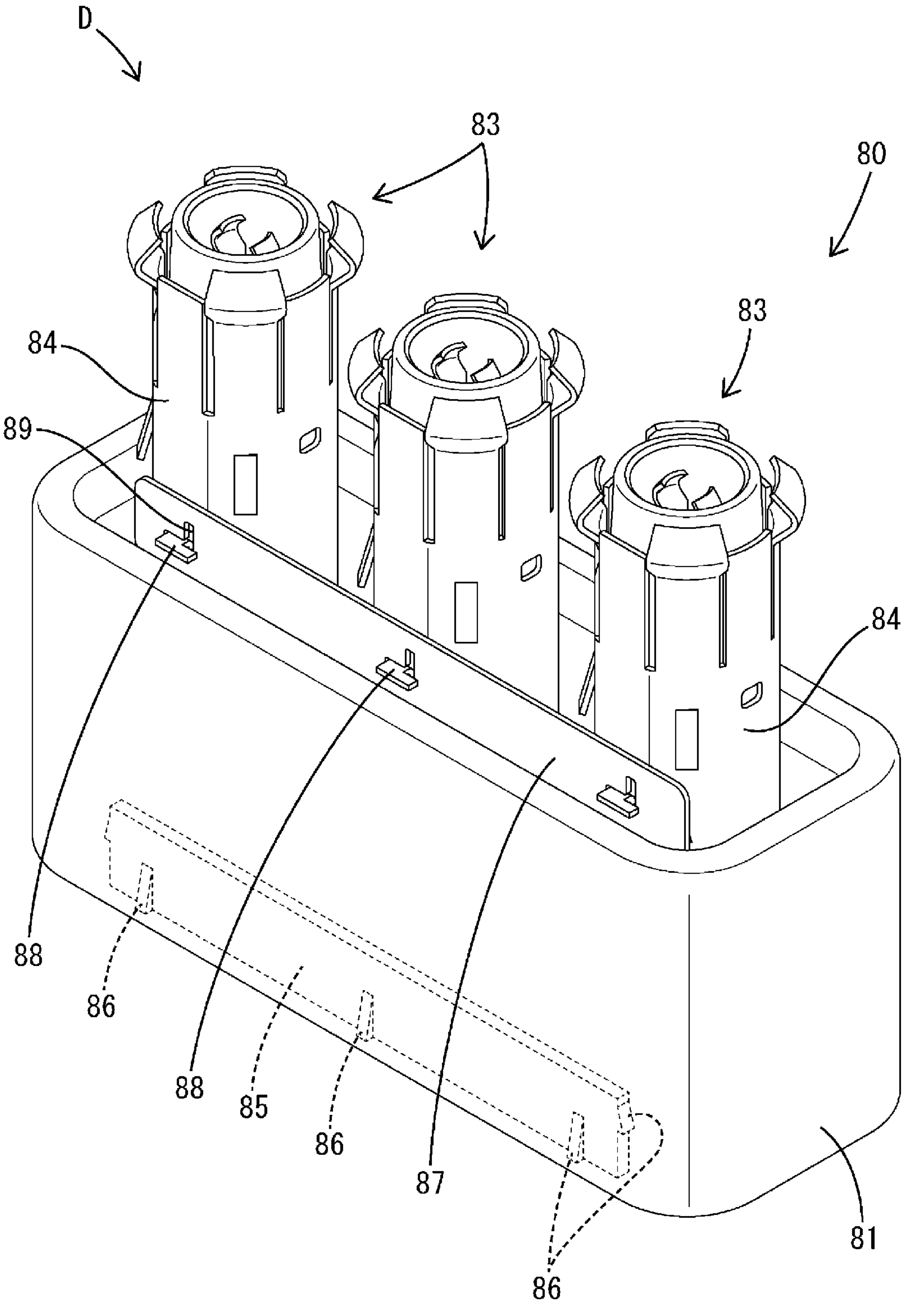
FIG. 9 is a perspective view of a second connector of a second embodiment.
Figure 10:
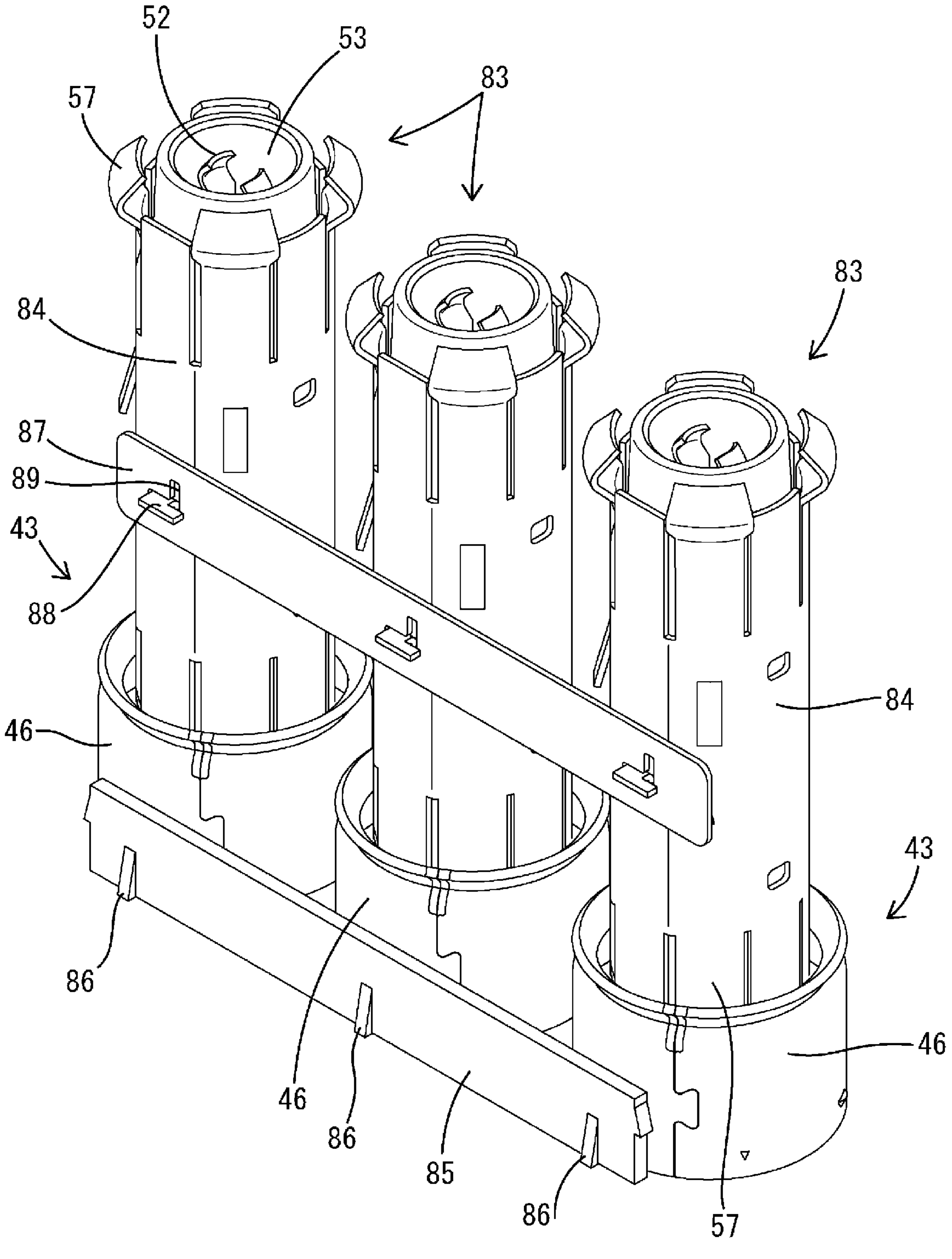
FIG. 10 is a perspective view showing a positional relationship of a plurality of movable outer conductors and a connecting member.

The connector device A of this embodiment includes, as shown in FIG. 8, a first connector 10 to be mounted on a first circuit board B and a second connector 30 to be mounted on a second circuit board C. The first circuit board B is, for example, provided in a shark fin antenna (not shown) to be mounted in a roof (not shown) of an automotive vehicle. The first circuit board B is horizontally arranged with a mounting surface facing down, i.e. facing the inner side of the vehicle. The second circuit board C is, for example, provided in an ECU mounted on the roof of the automotive vehicle, and horizontally arranged with a mounting surface facing up, i.e. facing toward the shark fin antenna. The first and second circuit boards B, C are arranged in such a positional relationship that the mounting surfaces thereof are facing each other in parallel.

The first and second connectors 10, 30 are electrically conductively connected by bringing the first circuit board B closer to the second circuit board C. By connecting the both connectors 10, 30, the first and second circuit boards B, C are connected without via a wiring harness, and high-speed communication becomes possible between the first and second circuit boards B, C. In a part of the roof of the automotive vehicle where the shark fin antenna is mounted, assembling tolerances between the roof and the shark fin antenna are relatively large. Thus, the first and second circuit boards B, C are possibly positionally deviated in a horizontal direction intersecting a connecting direction of the both connectors 10, 30. In the connector device A of this embodiment, the both connectors 10, 30 are connected while positional deviations of the both circuit boards B, C are absorbed.

As shown in FIG. 8, the first connector 10 includes a first housing 11 and a plurality of first terminal units 16. With the first connector 10 mounted on the first circuit board B, the upper surface of the first housing 11 is fixed to the first circuit board B and upper end parts of the plurality of first terminal units 16 are connected to a printed circuit (not shown) of the first circuit board B. The first housing 11 is a single component made of synthetic resin and including a first terminal holding portion 12 having a rectangular parallelepiped shape and a guiding portion 14 having a rectangular shape. The first terminal holding portion 12 is formed with a plurality of first terminal accommodation chambers 13 vertically penetrating through the first terminal holding portion 12. In a plan view of the first connector 10, the first terminal accommodation chamber 13 is circular. The plurality of first terminal accommodation chambers 13 are arranged to be aligned in the front-rear direction and the lateral direction.

The guiding portion 14 has a skirt shape projecting obliquely downward from the outer peripheral edge of the lower end of the first terminal holding portion 12. The guiding portion 14 is inclined to be wider toward the bottom with respect to the connecting direction of the both connectors 10, 30. The guiding portion 14 is continuous over the entire periphery of the first terminal holding portion 12. In a plan view, the guiding portion 14 surrounds all of the plurality of terminal accommodation chambers 13. A space in the first housing 11 defined by the guiding portion 14 below the first terminal holding portion 12 functions as a first swinging space 15. The first swinging space 15 is open downward of the first housing 11.

The plurality of first terminal units 16 are individually accommodated in the plurality of first terminal accommodation chambers 13. As shown in FIG. 8, the first terminal unit 16 includes a first inner conductor 17 made of metal, a first dielectric 21 made of synthetic resin and a first outer conductor 22 made of metal. The first inner conductor 17 has a tubular shape having an axis oriented parallel to the connecting direction of the both connectors 10, 30. The first inner conductor 17 includes a small diameter portion 18, a claw portion 19 radially projecting from the outer periphery of the small diameter portion 18 and a large diameter portion 20 having a larger diameter than the small diameter portion 18. The small diameter portion 18 and the large diameter portion 20 are connected in an axial direction. The first dielectric 21 has a disk shape having a center hole. The first outer conductor 22 has a hollow cylindrical shape having an axis oriented parallel to the first inner conductor 17 and the first dielectric 21.

The first terminal unit 16 is formed such that the small diameter portion 18 of the first inner conductor 17 is coaxially surrounded by the first dielectric 21 and the first inner conductor 17 and the first dielectric 21 are coaxially surrounded by the first outer conductor 22. The first dielectric 21 is located in an upper end part of the first outer conductor 22. A space in the first outer conductor 22 below the first dielectric 21 functions as a connection space 23 open downward. In the connection space 23, the large diameter portion 20 of the first inner conductor 17 projects downward. Each connection space 23 communicates with the swinging space 15.

As shown in FIG. 2, the second connector 30 includes a second housing 31, as many second terminal units 43 as the first terminal units 16 and as many movable terminal units 50 as the second terminal units 43. With the second connector 30 mounted on the second circuit board C, the lower surface of the second housing 31 is fixed to the second circuit board C and lower end parts of a plurality of the second terminal units 43 are connected to a printed circuit (not shown) of the second circuit board C. The second housing 31 is a single component made of synthetic resin and including a second terminal holding portion 32 having a rectangular parallelepiped shape, a peripheral wall portion 34 having a rectangular shape and a pair of bilaterally symmetrical holding projections 40.

The second terminal holding portion 32 is formed with as many second terminal accommodation chambers 33 as the second terminal units 43. The second terminal accommodation chambers 33 vertically penetrate through the second terminal holding portion 32. In a plan view of the second connector 30, the second terminal accommodation chamber 33 is circular. A plurality of the second terminal accommodation chambers 33 are arranged to be aligned in the front-rear direction and the lateral direction, similarly to the plurality of first terminal accommodation chambers 13.

As shown in FIG. 2, the peripheral wall portion 34 projects upward in parallel to the connecting direction of the both connectors 10, 30 from the outer peripheral edge of the upper end of the second terminal holding portion 32. In a plan view, the peripheral wall portion 34 surrounds all of the plurality of second terminal accommodation chambers 33. A space of the second housing 31 defined by the peripheral wall portion 34 above the second terminal holding portion 32 functions as a second swinging space 35. The second swinging space 35 is open upward of the second housing 31, i.e. toward the first connector 10. Both left and right side wall portions 36 constituting the peripheral wall portion 34 are formed with cut portions 37. The cut portions 37 are substantially rectangular cuts formed to extend downward from the upper end edges of the side wall portions 36.

Figure 6:
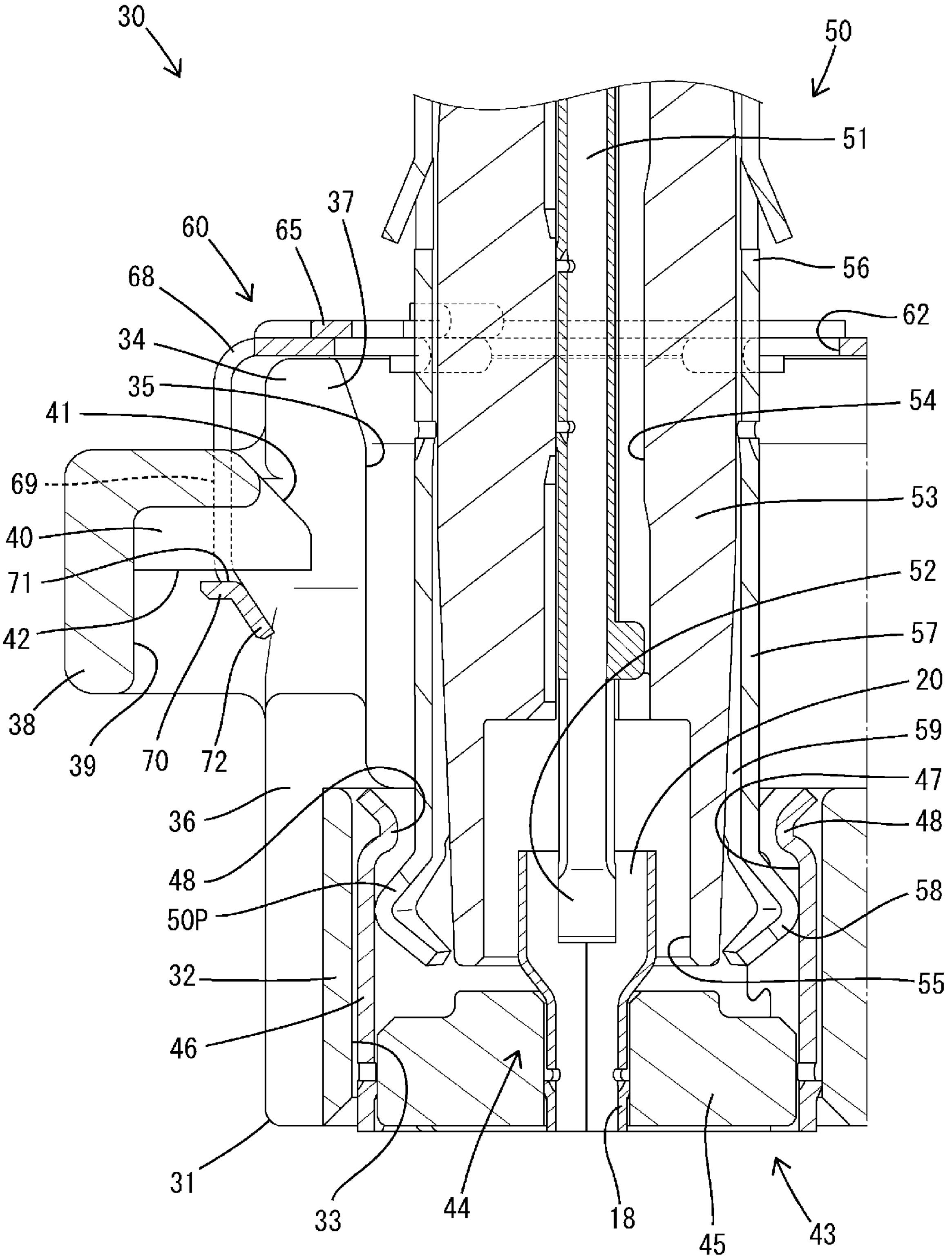
FIG. 6 is a side view in section of the second connector.

Supporting wall portions 38 covering the cut portions 37 from laterally outer sides are formed on the both side wall portions 36. Both front and rear end parts of the supporting wall portion 38 are bent and connected to the outer side surface of the side wall portion 36. A space defined by the supporting wall portion 38 functions as a holding space 39 communicating with the second swinging space 35 via the cut portion 37. Holding projections 40 are formed on the inner side surfaces of the both left and right supporting wall portions 38. The holding projection 40 projects into the holding space 39 from a central part in the front-rear direction of the supporting wall portion 38. As shown in FIG. 6, a guide slope 41 inclined downward toward the second swinging space 35 from the side of the supporting wall portion 38 is formed on the upper surface of the holding projection 40. The lower surface of the holding projection 40 functions as a fixed-side facing surface 42 intersecting the connecting direction of the both connectors 10, 30.

Figure 5:
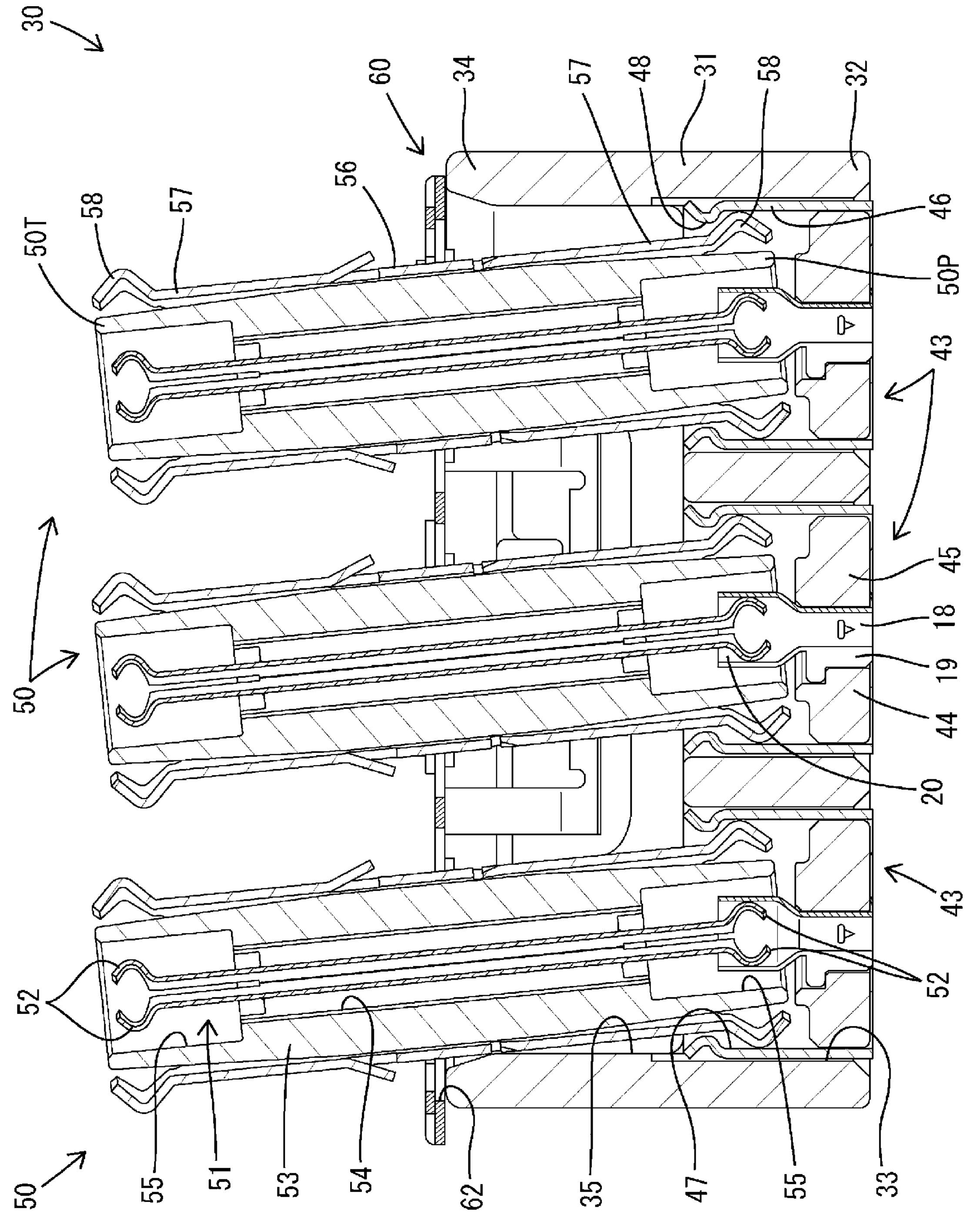
FIG. 5 is a front view in section of the second connector.

As shown in FIG. 5, the plurality of second terminal units 43 are individually accommodated in the plurality of second terminal accommodation chambers 33. As shown in FIG. 6, the second terminal unit 43 includes a second inner conductor 44 made of metal, a second dielectric 45 made of synthetic resin and a second outer conductor 46 made of metal. The second inner conductor 44 is the same component as the first inner conductor 17 and includes a small diameter portion 18, a claw portion 19 and a large diameter portion 20. The second inner conductor 44 is arranged in an orientation opposite to that of the first inner conductor 17 in an axial direction. The second dielectric 45 is the same component as the first dielectric 21 and arranged in an orientation vertically inverted from that of the first dielectric 21 in the axial direction. The second outer conductor 46 has a hollow cylindrical shape having an axis oriented parallel to the second inner conductor 44 and the second dielectric 45.

The second terminal unit 43 is formed such that the small diameter portion 18 of the second inner conductor 44 is coaxially surrounded by the second dielectric 45 and the second inner conductor 44 and the second dielectric 45 are coaxially surrounded by the second outer conductor 46. The second dielectric 45 is located in a lower end part of the second outer conductor 46. A space above the second dielectric 45 in the second outer conductor 46 functions as a supporting space 47 open upward. In the supporting space 47, the large diameter portion 20 of the second inner conductor 44 projects upward. Each supporting space 47 communicates with the second swinging space 35. A diameter reduced portion 48 continuous over the entire circumference is formed on the inner periphery of an upper end part of the second outer conductor 46. The diameter reduced portion 48 is arranged in the supporting space 47 and shaped to bulge radially inward.

As shown in FIGS. 2 and 5, the movable terminal unit 50 has an elongated shape as a whole. The movable terminal unit 50 is symmetrical to have the same shape when both axial end parts are inverted. As shown in FIG. 5, the movable terminal unit 50 is a member including a movable inner conductor 51 made of metal, a movable dielectric 53 made of synthetic resin and a movable outer conductor 56 made of metal. A pair of resilient claw pieces 52 resiliently deformable in a radial direction are formed on each of both axial end parts of the movable inner conductor 51.

The movable dielectric 53 is made of synthetic resin and has a hollow cylindrical shape coaxial with an axis of the movable terminal unit 50. An insertion hole 54 coaxially penetrating through the movable dielectric 53 is formed in a central part of the movable dielectric 53. Circular accommodation recesses 55 are formed in both axial end parts of the movable dielectric 53 by coaxially recessing both end surfaces of the movable dielectric 53. The accommodation recesses 55 are spaces constituting both axial end parts of the insertion hole 54. Inner diameters of the accommodation recesses 55 are larger than that of the insertion hole 54.

The movable outer conductor 56 has a hollow cylindrical shape as a whole. As shown in FIGS. 2 and 5, a plurality of resilient arm portions 57 disposed at intervals in a circumferential direction are formed on both axial end parts of the movable outer conductor 56. The resilient arm portion 57 is cantilevered toward the axial end part and resiliently deformable in a radial direction. A diameter expanded portion 58 is formed on an extending end part of the resilient arm portion 57.

The movable terminal unit 50 is formed such that the movable inner conductor 51 is inserted in the insertion hole 54 of the movable dielectric 53 and the movable outer conductor 56 is fit on the outer periphery of the movable dielectric 53. The resilient claw pieces 52 of the movable inner conductor 51 are located in the accommodation recesses 55. As shown in FIG. 6, deflection spaces 59 for allowing resilient deformation of the resilient arm portions 57 are secured between the outer peripheries of the both axial end parts of the movable dielectric 53 and the inner peripheries of the resilient arm portions 57 of the movable outer conductor 56.

One end part of the movable terminal unit 50 is attached, as a base end part 50P of the movable terminal unit 50, to the second terminal unit 43. In attaching, the base end part 50P of the movable terminal unit 50 is inserted into the supporting space 47 of the second connector 30. With the movable terminal unit 50 attached to the second terminal unit 43, the large diameter portion 20 of the second inner conductor 44 is accommodated in the accommodation recess 55 and the resilient claw pieces 52 of the movable inner conductor 51 resiliently contact the inner periphery of the large diameter portion 20 of the second inner conductor 44. The resilient arm portions 57 of the movable outer conductor 56 are resiliently deformed and the diameter expanded portion 58 resiliently contacts the inner periphery of the second outer conductor 46.

The diameter expanded portion 58 of the movable outer conductor 56 is locked to the diameter reduced portion 48 of the second outer conductor 46, thereby restricting the separation of the movable terminal unit 50 from the second terminal unit 43. Even if the movable terminal unit 50 is vertically inverted to project downward from the second terminal unit 43, a locked state of the diameter expanded portion 58 and the diameter reduced portion 48 is maintained. The plurality of movable terminal units 50 can individually swing with contact parts of the base end parts 50P and the second terminal units 43 as fulcrums. Even if the movable terminal unit 50 swings in the front-rear direction or lateral direction with respect to the second terminal unit 43, the locked state of the diameter expanded portion 58 and the diameter reduced portion 48 is maintained.

The movable terminal unit 50 attached to the second terminal unit 43 projects upward from the second housing 31. The other end part, i.e. the upper end part, of the movable terminal unit 50 is connected, as a tip part 50T of the movable terminal unit 50, to the first terminal unit 16. Here, since one movable terminal unit 50 is supported in contact with only one second terminal unity 43, each of the plurality of movable terminal units 50 can individually swing in a direction different from the other movable terminal units 50. However, in a state where the plurality of movable terminal units 50 swing in mutually different directions, the tip parts 50T of the plurality of movable terminal units 50 cannot be simultaneously connected to the plurality of first terminal units 16 when the first and second connectors 10, 30 are connected.

As a measure against that, the second connector 30 is provided with an alignment member 60. The alignment member 60 is a single component formed by bending a metal plate material punched into a predetermined shape. As shown in FIG. 3, the alignment member 60 includes a plate-like body portion 61 and a pair of bilaterally symmetrical resilient holding pieces 68. The plate-like body portion 61 is a flat plate having a plate thickness direction oriented parallel to the connecting direction of the both connector 10, 30. The plate-like body portion 61 has the same shape as the peripheral wall portion 34 of the second housing 31 in a plan view.

The plate-like body portion 61 is formed with a plurality of hole portions 62 in the same arrangement as the plurality of second terminal units 43 in a plan view. The hole portion 62 has a circular shape having an inner diameter larger than an outer diameter of the movable outer conductor 56, and vertically penetrates through the plate-like body portion 61. A plurality of fixed projections 63 spaced apart in a circumferential direction are formed on the inner periphery of the hole portion 62. The fixed projections 63 are formed by closely bending tip parts of extending parts extending toward a radial center from the inner periphery of the hole portion 62 so that the tip parts are folded downward.

The outer peripheral surface of the projecting end part of the fixed projection 63 functions as a fixed contact portion 64 in the form of a semicircular curved surface. The entire region of the fixed contact portion 64 is formed only by a non-fracture surface different from a fracture surface produced by press working, out of surfaces of the alignment member 60. A diameter of an inscribed circle inscribed in the projecting ends of the plurality of fixed projections 63, i.e. the plurality of fixed contact portions 64 is equal to or slightly larger than the outer diameter of the movable outer conductor 56.

The plate-like body portion 61 is integrally formed with a plurality of resilient contact pieces 65 disposed to overlap on the upper surface of the plate-like body portion 61. The resilient contact piece 65 has an arcuate shape in a plan view. One resilient contact piece 65 is cantilevered along an opening edge of one hole portion 62 with the outer peripheral edge of the plate-like body portion 61 as a base point. A movable projection 66 is formed on an extending end part of the resilient contact piece 65. The movable projection 66 is formed by closely bending a tip part of an extending part extending toward the radial center from the inner periphery of the extending end part of the resilient contact piece 65 so that the tip part is folded upward. The outer peripheral surface of the projecting end part of the movable projection 66 functions as a movable contact portion 67 in the form of a semicircular curved surface. The entire region of the movable contact portion 67 is formed only by a non-fracture surface, similarly to the fixed contact portion 64.

Figure 7:
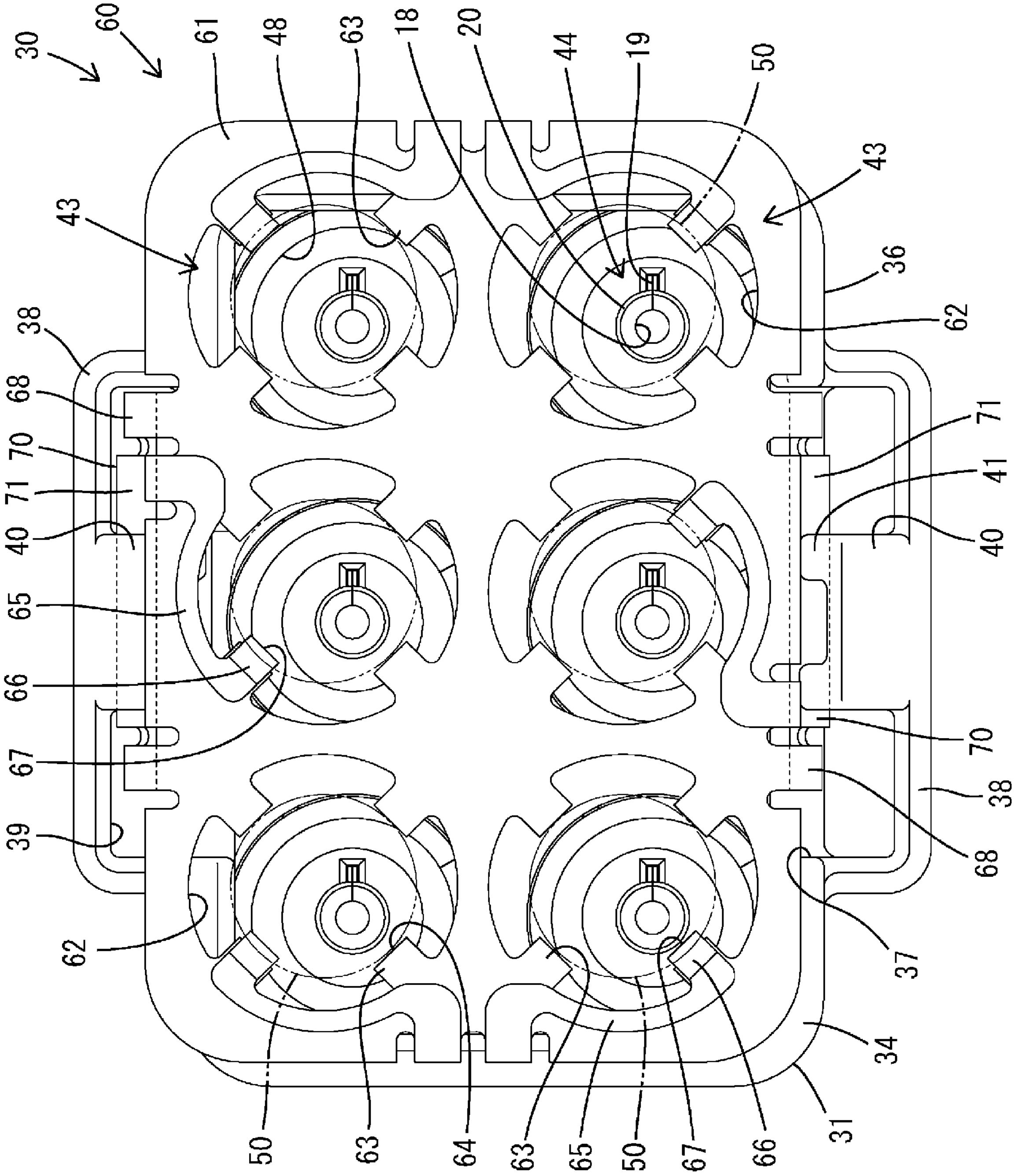
FIG. 7 is a plan view showing a state where the alignment member is removed in the second connector.

As shown in FIG. 3, the resilient holding piece 68 includes a pair of front and rear leg portions 69 extending downward at a right angle to the plate-like body portion 61 from a side edge of the plate-like body portion 61 and a locking portion 70 coupling the extending ends of the both leg portions 69. The locking portion 70 is in the form of a plate parallel to the plate-like body portion 61. As shown in FIGS. 3 and 7, the upper surface of the locking portion 70 serves as a movable-side facing surface 71. The movable-side facing surface 71 faces the fixed-side facing surface 42 in the vertical direction parallel to the connecting direction of the both connectors 10, 30. The resilient holding piece 68 is formed with a guided portion 72 protruding obliquely downward from the inner side edge of the locking portion 70.

The alignment member 60 is mounted on the second housing 31 by being brought closer to the second housing 31 from above. In a mounting process, a pair of the guided portions 72 slide in contact with a pair of the guide slopes 41, whereby the pair of resilient holding pieces 68 are resiliently deformed to be displaced in directions toward each other, i.e. toward the second swinging space 35. If the guided portions 72 and the locking portions 70 pass through the holding projections 40, the pair of resilient holding pieces 68 resiliently return to be separated from each other and accommodated into the holding spaces 39. The movable-side facing surfaces 71 of the resilient holding pieces 68 face the fixed-side facing surfaces 42 of the second housing 31 from below. In the above way, the assembling of the alignment member 60 with the second housing 31 is completed.

With the alignment member 60 mounted on the second housing 31, an outer peripheral edge part of the plate-like body portion 61 is placed on the upper end surface of the peripheral wall portion 34, the leg portions 69 and the locking portions 70 are accommodated in the holding spaces 39, and the locking portions 70 creep under the holding projections 40. By locking the locking portions 70 to the holding projections 40, the separation of the alignment member 60 from the second housing 31 is restricted. With the outer peripheral edge of the plate-like body portion 61 aligned with the peripheral wall portion 34, clearances are secured between the leg portions 69 and the supporting wall portions 38 and between the locking portions 70 and the supporting wall portions 38.

Accordingly, the alignment member 60 is held on the second housing 31 with a relative displacement in a direction parallel to the plate-like body portion 61 allowed. The direction parallel to the plate-like body portion 61 is a direction which intersects perpendicularly to the connecting direction of the both connectors 10, 30 and in which positional deviations of the both circuit boards B, C are assumed. A relative displacement amount of the alignment member 60 with respect to the second housing 31 reaches its maximum when the leg portions 69 or the locking portions 70 come into contact with the supporting wall portions 38. With the relative displacement amount of the alignment member 60 with respect to the second housing 31 maximized, a state where at least parts of the movable-side facing surfaces 71 vertically face at least parts of the fixed-side facing surfaces 42 is maintained. Therefore, even if the displacement amount of the alignment member 60 is maximum, the alignment member 60 is kept mounted on the second housing 31.

After the alignment member 60 is mounted on the second housing 31, the plurality of movable terminal units 50 are attached to the second terminal units 43. In attaching the movable terminal unit 50, the base end part 50P of the movable terminal unit 50 is inserted into the second swinging space 35 through the hole portion 62 and fit into the supporting space 47 of the second terminal unit 43. Note that the alignment member 60 may be mounted on the second housing 31 after the movable terminal units 50 are attached to the second terminal units 43.

With the movable terminal units 50 and the alignment member 60 mounted in the second housing 31, the outer peripheries of the movable outer conductors 56 are surrounded over the entire circumference by hole edge parts of the hole portions 62. Since the fixed contact portions 64 and the movable contact portions 67 are in contact with the outer peripheries of the movable outer conductors 56, the movable terminal units 50 are held in the alignment member 60 with relative displacements in directions parallel to the plate-like body portion 61 restricted. The alignment member 60 is made of a metal material and electrically conductive. By the contact of the fixed contact portions 64 and the movable contact portions 67 with the outer peripheries of the movable outer conductors 56, the alignment member 60 and the plurality of movable terminal units 50 are electrically conductively connected.

The alignment member 60 is in contact with the movable outer conductor 56 in a region between the resilient arm portions 57 on the side of the base end part SOP and the resilient arm portions 57 on the side of the tip part SOP in the axial direction of the movable terminal unit 50. Therefore, neither the fixed contact portions 64 nor the movable contact portions 67 are in contact with the resilient arm portions 57. In this way, the damage and deformation of the resilient arm portions 57 are prevented.

By restricting a relative displacement of each movable terminal unit 50 with respect to the alignment member 60, relative displacements among the movable terminal units 50 are restricted by the alignment member 60. When an external force in a swinging direction is applied to any one of the movable terminal unit 50, all the movable terminal units 50 swing by the same angle in the same direction at once, integrally with the alignment member 60. Thus, the tip parts 50T of all the movable terminal units 50 are maintained in a fixed positional relationship regardless of the swinging direction and the swing angle of the movable terminal units 50. The maintained positional relationship is the same as the arrangement of the plurality of first terminal units 16. The movable terminal unit 50 swings with the connected part of the second terminal unit 43 and the base end part SOP of the movable terminal unit 50 as a fulcrum. The swing angle of the movable terminal unit 50 reaches its maximum when the movable terminal unit 50 comes into contact with the peripheral wall portion 34.

A displacement amount of the alignment member 60 when the movable terminal unit 50 is inclined becomes larger as a contact position of the alignment member 60 gets closer to the tip part 50T of the movable terminal unit 50. A pressing force generated between the movable terminal unit 50 and the alignment member 60 when the movable terminal unit 50 sliding in contact with the guiding portion 14 pushes the alignment member 60 in a horizontal direction increases as the contact position of the alignment member 60 gets closer to the base end part 50P of the movable terminal unit

50. Since the contact position of the alignment member 60 is an intermediate position between the base end part 50P and the tip part 50T in the first embodiment, the pressing force generated between the movable terminal unit 50 and the alignment member 60 can be reduced while the displacement amount of the alignment member 60 when the movable terminal unit 50 is inclined is suppressed.

If the first and second circuit boards B, C are relatively displaced when the first and second connectors 10, 30 are connected, the tip part 50T of any one of the movable terminal units 50 comes into contact with the inner surface of the guiding portion 14. If the both connectors 10, 30 are further connected from this state, the tip part 50T of the movable terminal unit 50 slides in contact with the inclined inner surface of the guiding portion 14, whereby the tip parts 50T of all the movable terminal units 50 are guided to connection positions to the first terminal units 16 while changing the swing angles at once. During this time, the base end parts 50P of the movable terminal units 50 swing in the second swinging space 35 and the tip parts 50T of the movable terminal units 50 swing in the first swinging space 15.

After passing through the guiding portion 14, the tip parts 50T of the movable terminal units 50 enter the connection spaces 23 of the first terminal units 16 and are connected to the first terminal units 16. When the tip parts 50T of the movable terminal units 50 are connected to the first terminal units 16, the first and second connectors 10, 30 are properly connected. When the both connectors 10, 30 are properly connected, the first and second circuit boards B, C are connected via the first terminal units 16, the alignment member 60 and the second terminal units 43.

The movable inner conductor 51 is inserted in the insertion hole 54 of the movable dielectric 53 with a clearance formed therebetween. Accordingly, the movable inner conductor 51 can be relatively displaced to incline an axis with respect to the movable dielectric 53 and the movable outer conductor 56. In this way, a good contact state of the movable inner conductor 51 with the first and second inner conductors 17, 44 and a good contact state of the movable outer conductor 56 with the first and second outer conductors 22, 46 can be combined regardless of the swing angle even if the movable terminal unit 50 swings and an axis of the movable terminal unit 50 is inclined with respect to those of the first and second terminal units 16, 43.

The connector device A of this embodiment includes the first connector 10 to be mounted on the first circuit board B and the second connector 30 to be mounted on the second circuit board C. The first connector 10 includes the plurality of first terminal units 16 each formed such that the first inner conductor 17 is surrounded by the first outer conductor 22. The second connector 30 includes the plurality of second terminal units 43 facing the plurality of first terminal units 16, and the plurality of movable terminal units 50. The second terminal unit 43 is formed such that the second inner conductor 44 is surrounded by the second outer conductor 46. The movable terminal unit 50 is swingable with the second terminal unit 43 as a fulcrum. The tip part 50T of the movable terminal unit 50 is connectable to the first terminal unit 16. The plurality of movable terminal units 50 are coupled to swing integrally by the alignment member 60.

According to this configuration, the plurality of movable terminal units 50 are caused to swing integrally by the alignment member 60. Thus, the tip parts 50T of the plurality of movable terminal units 50 maintain the same positional relationship as the array of the plurality of first terminal units 16, regardless of at which angle and in which direction the movable terminal unit 50 swings. In this way, the plurality of movable terminal units 50 are reliably connected to the plurality of first terminal units 16. Therefore, the connector device A of this embodiment is excellent in the reliability of a connecting operation.

The first connector 10 includes the guiding portion 14 for guiding the tip parts 50T of the movable terminal units 50 toward the first terminal units 16. By providing the guiding portion 14, the tip parts 50T of the movable terminal units 50 can be reliably connected to the first terminal units 16 only by bringing the first and second connectors 10, 30 closer to each other. The guiding portion 14 is formed to collectively surround all of the plurality of movable terminal units 50 in a connection process of the both connectors 10, 30. According to this configuration, since the plurality of movable terminal units 50 slide in contact with the guiding portion 14, it can be avoided that a load concentrates only on a specific one of the movable terminal units 50.

The alignment member 60 includes the plurality of hole portions 62 through which the plurality of movable terminal units 50 are individually passed. The inner peripheral edge of the hole portion 62 surrounds the movable terminal unit 50 over the entire circumference. Accordingly, regardless of in which direction the movable terminal unit 50 swings, the movable terminal unit 50 is not separated from the alignment member 60. The alignment member 60 includes the fixed contact portions 64 and the movable contact portions 67 configured to contact the movable outer conductors 56 of the movable terminal units 50 with the non-fracture surfaces. Therefore, it can be prevented that the outer peripheral surfaces of the movable outer conductors 56 are damaged by the fracture surfaces of the alignment member 60.

The movable terminal unit 50 is a member separate from the second terminal unit 43. The movable outer conductor 56 of the movable terminal unit 50 includes the diameter expanded portion 58. The second outer conductor 46 of the second terminal unit 43 includes the diameter reduced portion 48. The diameter expanded portion 58 and the diameter reduced portion 48 function as supporting portions for swingably supporting the movable terminal unit 50 with respect to the first terminal unit 43. According to this configuration, even if the second connector 30 is so oriented that the movable terminal units 50 project downward from the second terminal units 43, the movable terminal units 50 can be held in the second terminal units 43.

The second connector 30 includes the second housing 31 and the plurality of second terminal units 43. The second housing 31 holds the plurality of second terminal units 43. The alignment member 60 includes the resilient holding pieces 68 and the second housing 31 includes the holding projections 40. The resilient holding pieces 68 and the holding projections 40 function as holding portions for holding the alignment member 60 in a state mounted on the second housing 31. According to this configuration, since the alignment member 60 and the second housing 31 can be integrated, handling becomes easier.

The resilient holding piece 68 serving as the holding portion on the side of the alignment member 60 has the movable-side facing surface 71, and the holding projection 40 serving as the holding portion on the side of the second housing 31 has the fixed-side facing surface 42. The movable-side facing surface 71 and the fixed-side facing surface 42 are facing each other in a direction intersecting a displacement direction of the alignment member 60 when the movable terminal unit 50 swings. When the alignment member 60 is in a range where a displacement is allowed, the movable-side facing surface 71 and the fixed-side facing surface 42 are positioned to face each other. According to this configuration, when the movable terminal unit 50 swings, the alignment member 60 can be displaced even without resiliently deforming the resilient holding pieces 68.

The connector device A of the first embodiment includes the plurality of first terminal units 16 to be mounted on the first circuit board B, the plurality of second terminal units 43 to be mounted on the second circuit board C, the plurality of movable terminal units 50 and the alignment member 60. The first terminal unit 16 includes the first outer conductor 22 surrounding the first inner conductor 17. The second terminal unit 43 includes the second outer conductor 46 surrounding the second inner conductor 44. The movable terminal unit 50 includes the movable outer conductor 56 surrounding the movable inner conductor 51. The movable terminal unit 50 is swingable with the second terminal unit 43 as a fulcrum. The tip part SOT of the movable terminal unit 50 is connectable to the first terminal unit 16.

The alignment member 60 is made of an electrically conductive material. The alignment member 60 functions as a connecting member for shorting the plurality of movable outer conductors 56 to each other. Since the plurality of movable outer conductors 56 are made electrically conductive with each other via the alignment member 60, no potential difference is produced among the plurality of movable outer conductors 56. In this way, no potential difference is produced also among the plurality of first outer conductors 22 and no potential difference is produced also among the plurality of second outer conductors 46. Therefore, the connector device A of this embodiment is excellent in grounding performance.

The alignment member 60 includes the resilient contact pieces 65 configured to resiliently contact the movable outer conductors 56. Since the resilient contact piece 65 is cantilevered along the outer periphery of the movable outer conductor 56, even if the movable terminal unit 50 is radially displaced with respect to the alignment member 60, the resilient contact piece 65 flexibly follows a movement of the movable terminal unit 50. Since a contact state of the alignment member 60 and the movable outer conductor 56 is stabilized in this way, the alignment member 60 and the movable outer conductor 56 can be reliably kept in the contact state.

Second Embodiment

A second specific embodiment of the present disclosure is described with reference to FIGS. 9 to 12. A connector device D of the second embodiment differs from the first embodiment in a structure for electrically conductively connecting movable outer conductors 84 of a plurality of movable terminal units 83 in a second connector 80. Since the configurations of a first connector 10 (not shown in FIGS. 9 to 12) and second terminal units 43 are the same as in the first embodiment, the same components are denoted by the same reference signs and the structures, functions and effects thereof are not described.

Figure 11:
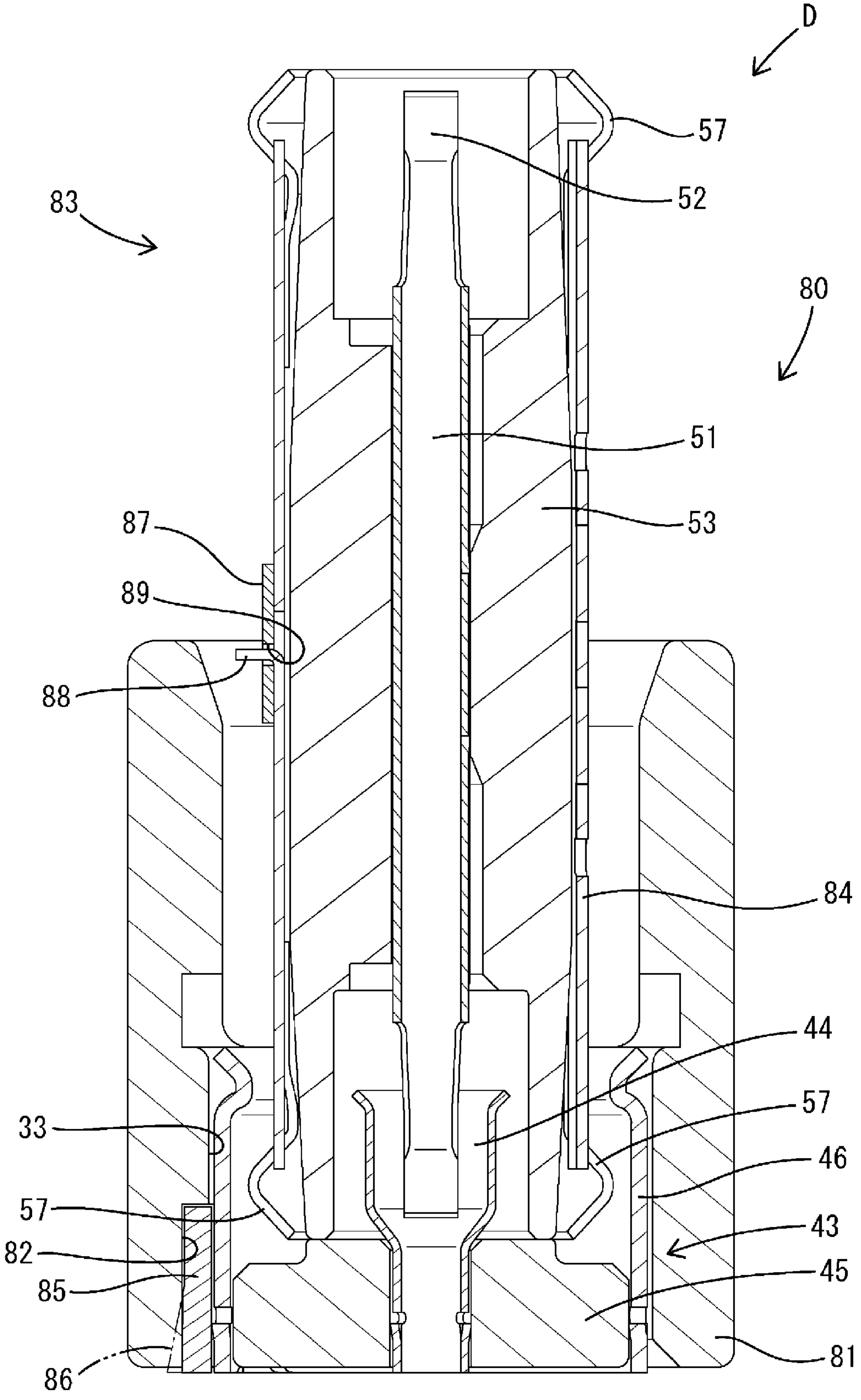
FIG. 11 is a section of the second connector.
Figure 12:
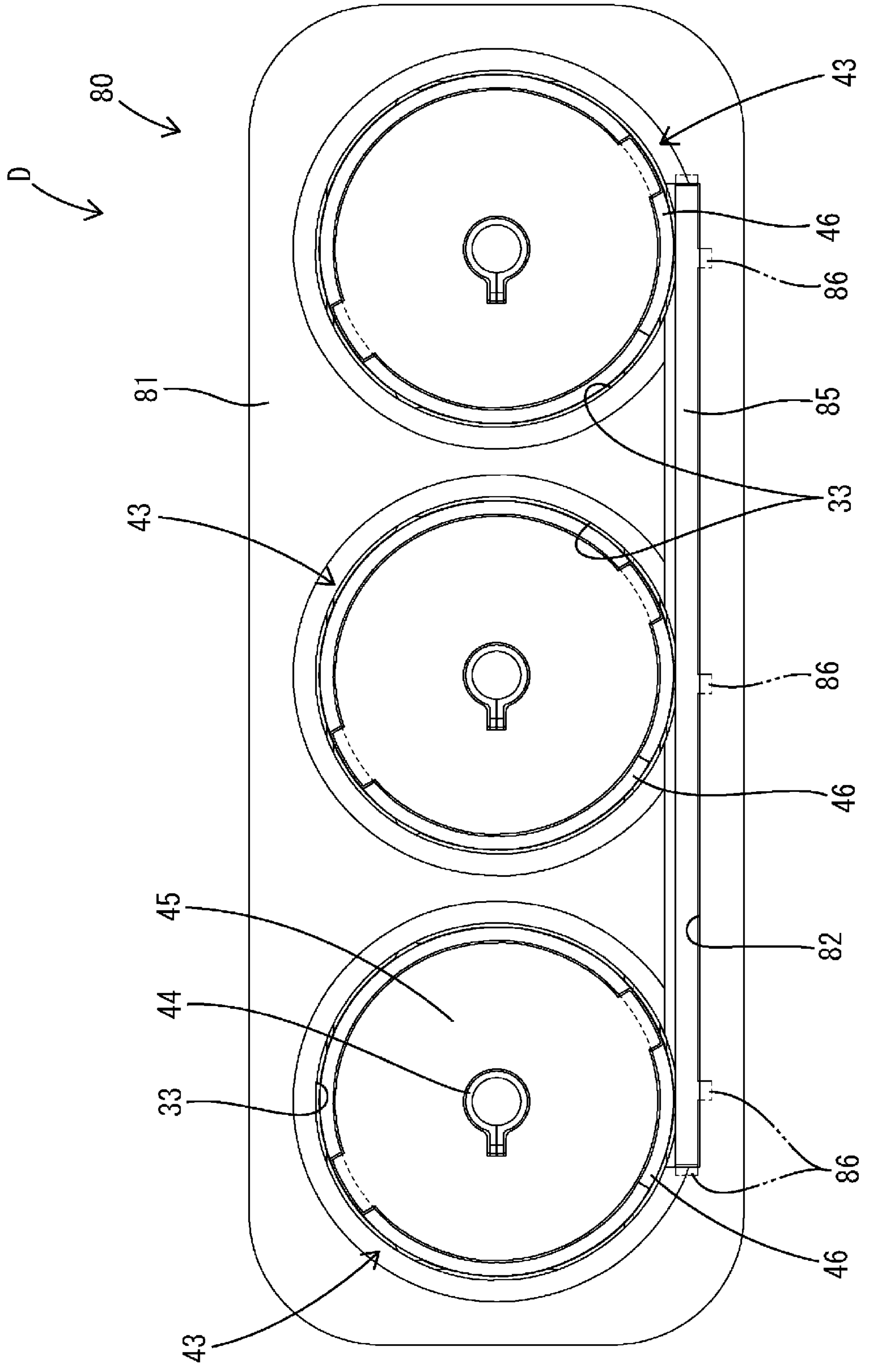
FIG. 12 is a bottom view of the second connector.

In the second connector 80 of the second embodiment, a plurality of the movable outer conductors 84 are held at the same potential using a connecting member 85, which is a component separate from the movable terminal units 83 and the second terminal units 43, instead of the alignment member 60 of the first embodiment. As shown in FIGS. 11 and 12, a mounting groove 82 used to mount the connecting member 85 is formed in a lower end part of a second housing 81. The mounting groove 82 is in the form of a slit open in the lower end surface of the second housing 81. The mounting groove 82 extends in parallel to an arrangement direction of a plurality of the second terminal units 43. The mounting groove 82 and a plurality of second terminal accommodation chambers 33 communicate with each other only in circumferential parts of the inner peripheral surfaces of the respective second terminal accommodation chambers 33.

The connecting member 85 is made of an electrically conductive material such as metal and in the form of a flat plate parallel to an arrangement direction of the plurality of second terminal accommodation chambers 33. A plurality of projection-like retaining portions 86 are formed on the outer surface of the connecting member 85. The connecting member 85 is accommodated into the mounting groove 82 by being press-fit from below the second housing 81. The connecting member 85 mounted in the mounting groove 82 is retained and held in the mounting groove 82 by the retaining portions 86 biting into the inner wall surface of the mounting groove 82.

Since the mounting groove 82 and the plurality of second terminal accommodation chambers 33 communicate with each other, the connecting member 85 is in electrically conductive contact with the circular outer peripheral surfaces of a plurality of second outer conductors 46 (second terminal units 43) while being externally tangent thereto. The plurality of second outer conductors 46 are held at the same potential via the connecting member 85. Resilient arm portions 57 in a lower end part of the movable outer conductor 84 are in resilient contact with the inner peripheral surface of the second outer conductor 46. Even if the movable terminal unit 83 swings, the resilient arm portions 57 are constantly kept in resilient contact with the inner peripheral surface of the second outer conductor 46. Therefore, the plurality of movable outer conductors 84 are constantly held at the same potential via the second outer conductors 46 and the connecting member 85.

Since the second connector 80 of the second embodiment does not include the alignment member 60 used in the first embodiment, the plurality of movable terminal units 83 are coupled by a coupling member 87. A projection 88 integrated with the movable outer conductor 84 is formed on the outer peripheral surface of the movable terminal unit 83. The projection 88 is integrally formed to the movable outer conductor 84 and formed from a plastically deformable metal plate material. The projection 88 is formed into a shape obtained by mirror inverting an L shape, and can be deformed into a single flat surface shape, which is an I shape laid to extend in a horizontal direction.

The coupling member 87 is formed from a flat plate elongated in a direction parallel to the arrangement direction of the plurality of movable terminal units 83. A material of the coupling member 87 may be an electrically conductive one such as metal or may be an electrically nonconductive one such as synthetic resin. The coupling member 87 is formed with a plurality of coupling holes 89 through which the plurality of projections 88 are passed. Each coupling hole 89 has a shape obtained by mirror inverting an L shape. The coupling member 87 is assembled with the plurality of movable terminal units 83 by passing the projections 88 through the respective coupling holes 89. The plurality of movable terminal units 83 can swing integrally by being coupled by the coupling member 87.

In the connector device D of the second embodiment, the plurality of second outer conductors 46 are fixed to the second housing 81 and the plurality of movable outer conductors 84 are individually in electrically conductive contact with the plurality of second outer conductors 46. The connecting member 85 is in electrically conductive contact with the plurality of second outer conductors 46. According to this configuration, since the second outer conductors 46 to be contacted by the connecting member 85 are fixed to the second housing 81, the contact reliability of the connecting member 85 and the second outer conductors 46 is high. Since potential differences among the plurality of second outer conductors 46 are eliminated in this way, the plurality of movable outer conductors 84 can be reliably held at the same potential.

Third Embodiment

Figure 13:
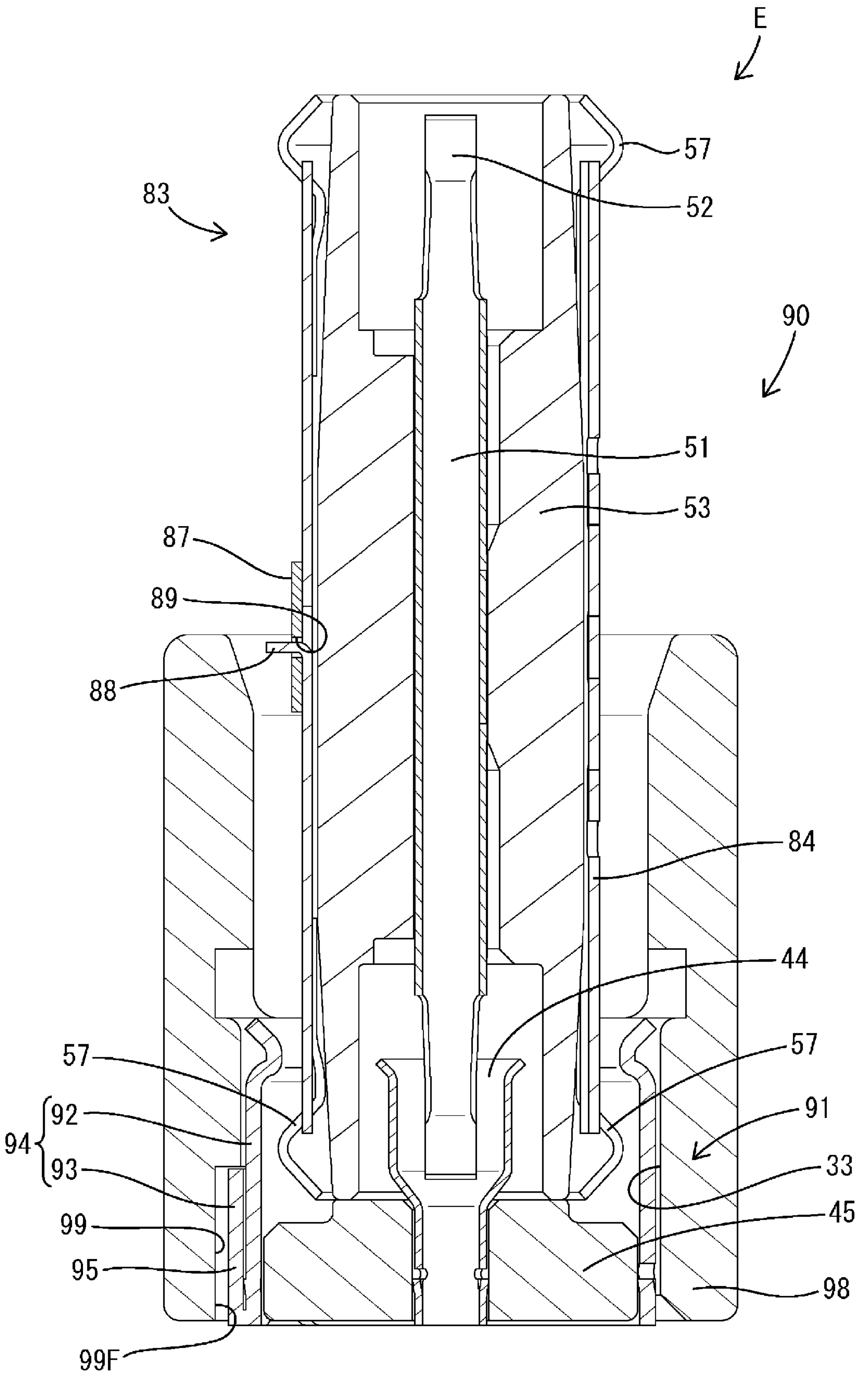
FIG. 13 is a section showing a second connector of a third embodiment.
Figure 14:
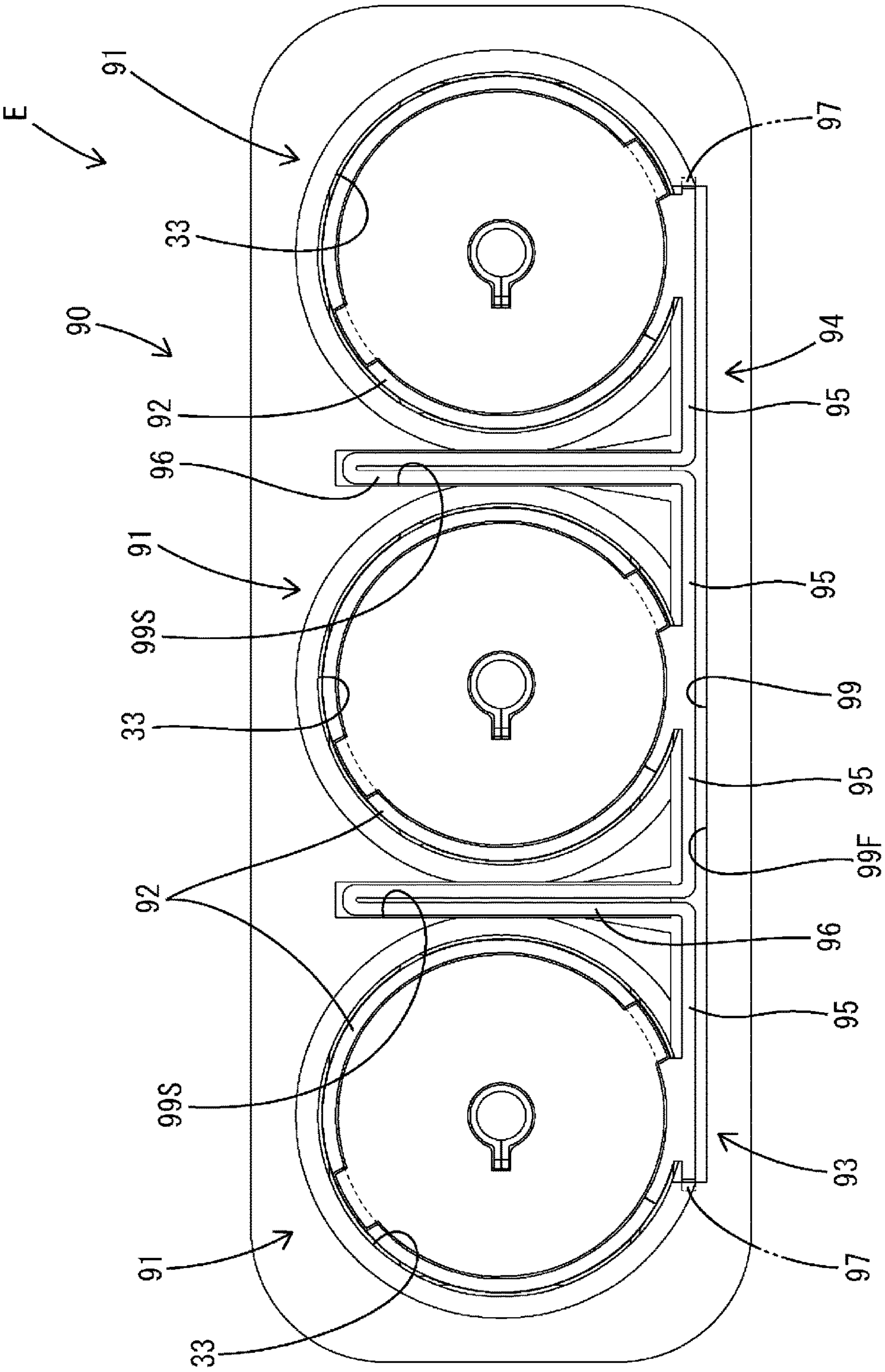
FIG. 14 is a bottom view of the second connector.

A third specific embodiment of the present disclosure is described with reference to FIGS. 13 and 14. A connector device E of the third embodiment differs from the second embodiment in a structure for electrically conductively connecting movable outer conductors 84 in a second connector 90. Since the configurations of a first connector 10 (not shown in FIGS. 13 and 14), movable terminal units 83 and a coupling member 87 are the same as in the second embodiment, the same components are denoted by the same reference signs and the structures, functions and effects thereof are not described.

In the second connector 90 of the third embodiment, the plurality of movable outer conductors 84 are held at the same potential using a connecting member 93, which is a component separate from the movable terminal units 83, instead of the alignment member 60 of the first embodiment. A plurality of second outer conductors 92 and the connecting member 93 constituting a plurality of second terminal units 91 are formed from a plate material made of an electrically conductive material such as metal, and are integrally formed as a single component. The second outer conductors 92 and the connecting member 93 constitute a terminal module 94. Therefore, the connecting member 93 and the plurality of second outer conductors 92 are constantly held at the same potential.

The terminal module 94 is formed from chained terminals (not shown) in which a plurality of the second outer conductors 92 project at fixed intervals from a side edge of an elongated strip-like carrier (not shown). One terminal module 94 is obtained by cutting the carrier of the chained terminals. The carrier functions as the connecting member 93. The connecting member 93 is bent to be externally tangent to the outer peripheral surfaces of the second outer conductors 92 having a hollow cylindrical shape. A part of the connecting member 93 between adjacent ones of the second outer conductors 92 is composed of two tangential connecting portions 95 and one folded connecting portion 96.

The tangential connecting portion 95 is directly connected to the second outer conductor 92 and extends in a tangential direction from the outer peripheral surface of the second outer conductor 92. The two tangential connecting portions 95 are linearly arranged with extending end parts thereof butted against each other. The folded connecting portion 96 extends at a right angle from the extending end parts of the two tangential connecting portions 95 and are closely bent. The folded connecting portion 96 is arranged to cut into a clearance between two adjacent second outer conductors 92. Projection-like retaining portions 97 are formed on both longitudinal end parts of the connecting member 93.

An accommodation groove 99 for accommodating the connecting member 93 of the terminal module 94 is formed in a lower end part of a second housing 98. As shown in FIG. 14, the accommodation groove 99 is open in the lower surface of the second housing 98. The accommodation groove 99 includes one first groove portion 99F and a plurality of second groove portions 99S branched from the first groove portion 99F. The first groove portion 99F is parallel to an arrangement direction of a plurality of second terminal accommodation chambers 33 and linearly extends. The first groove portion 99F and the plurality of second terminal accommodation chambers 33 communicate with each other only in circumferential parts of the inner peripheral surfaces of the respective second terminal accommodation chambers 33. The second groove portions 99S linearly extend in a direction at a right angle to the first groove portion 99F and arranged between adjacent ones of the second terminal accommodation chambers 33. The second groove portions 99S and the second terminal accommodation chambers 33 do not directly communicate with each other.

The terminal module 94 is inserted into the second terminal accommodation chambers 33 and the accommodation groove 99 from below the second housing 98. The tangential connecting portions 95 are accommodated into the first groove portion 99F of the accommodation groove 99, and the folded connecting portions 96 are accommodated into the second groove portions 99S. With the connecting member 93 accommodated in the accommodation groove 99, the retaining portions 97 of the connecting member 93 bite into the inner wall surface of the accommodation groove 99, whereby the terminal module 94 is held in the second housing 98.

Since the connecting member 93 and the plurality of second outer conductors 92 constitute the single component serving as the terminal module 94, the plurality of second outer conductors 92 are held at the same potential via the connecting member 93. Resilient arm portions 57 in a lower end part of the movable outer conductor 84 are in resilient contact with the inner peripheral surface of the second outer conductor 92. Even if the movable terminal unit 83 swings, the resilient arm portions 57 are constantly kept in resilient contact with the inner peripheral surface of the second outer conductor 92. Therefore, the plurality of movable outer conductors 84 are constantly held at the same potential via the terminal module 94.

In the connector device E of the third embodiment, the plurality of movable outer conductors 84 are individually in electrically conductive contact with the plurality of second outer conductors 92. The plurality of second outer conductors 92 constitute a single component (terminal module 94) integrated via the connecting member 93. According to this configuration, since the plurality of second outer conductors 92 constitute the single component, no potential difference is produced among the second outer conductors 92 and the plurality of movable outer conductors 84 can be reliably held at the same potential.

Other Embodiments

The present invention is not limited to the above described and illustrated embodiments and is represented by claims. The present invention is intended to include all changes in the scope of claims and in the meaning and scope of equivalents and also include the following embodiments.

Although the resilient contact piece is shaped to extend along the outer periphery of the movable outer conductor in the first embodiment, the resilient contact piece may extend toward the outer periphery of the movable outer conductor.

Although the alignment member (connecting member) is provided with the plurality of hole portions, through which the plurality of movable terminal units are individually passed, in the first embodiment, the movable terminal units may be held by a plurality of alignment members (connecting members) spaced apart in the circumferential direction.

Although the fixed contact portion and the movable contact portion formed by the non-fracture surfaces contact the movable terminal unit in the first embodiment, fracture surfaces may contact the movable terminal unit.

Although the holding portions (resilient holding pieces) on the connecting member side and the holding portions (holding projections) on the housing side are relatively displaceable in the first embodiment, both holding portions may be relatively undisplaceably fit. In this case, the connecting member can be moved by resiliently deforming at least either the holding portions on the connecting member side or the holding portions on the housing side.

Although the alignment member (connecting member) is a member separate from the housing in the first embodiment, the connecting member may be a member constituting the housing.

LIST OF REFERENCE NUMERALS

10 . . . first connector
11 . . . first housing
12 . . . first terminal holding portion
13 . . . first terminal accommodation chamber
14 . . . guiding portion
15 . . . first swinging space
6 . . . first terminal unit
17 . . . first inner conductor
18 . . . small diameter portion
19 . . . claw portion
20 . . . large diameter portion
21 . . . first dielectric
22 . . . first outer conductor
23 . . . connection space
30, 80, 90 . . . second connector
31, 81, 98 . . . second housing (housing)
32 . . . second terminal holding portion
33 . . . second terminal accommodation chamber
34 . . . peripheral wall portion
35 . . . second swinging space
36 . . . side wall portion
37 . . . cut portion
38 . . . supporting wall portion
39 . . . holding space
40 . . . holding projection (holding portion on housing side)
41 . . . guide slope
42 . . . fixed-side facing surface (facing surface)
43, 91 . . . second terminal unit
44 . . . second inner conductor
45 . . . second dielectric
46 . . . second outer conductor
47 . . . supporting space
48 . . . diameter reduced portion
50, 83 . . . movable terminal unit
50P . . . base end part of movable terminal unit
50T . . . tip part of movable terminal unit
51 . . . movable inner conductor
52 . . . resilient claw piece
53 . . . movable dielectric
54 . . . insertion hole
55 . . . accommodation recess
56, 84 . . . movable outer conductor
57 . . . resilient arm portion
58 . . . diameter expanded portion
59 . . . deflection space
60 . . . alignment member (connecting member)
61 . . . plate-like body portion
62 . . . hole portion
63 . . . fixed projection
64 . . . fixed contact portion (contact portion)
65 . . . resilient contact piece
66 . . . movable projection
67 . . . movable contact portion (contact portion)
68 . . . resilient holding piece (holding portion on connecting member side)
69 . . . leg portion
70 . . . locking portion
71 . . . movable-side facing surface (facing surface)
72 . . . guided portion
82 . . . mounting groove
85, 93 . . . connecting member
87 . . . coupling member
88 . . . projection
89 . . . coupling hole
94 . . . terminal module
95 . . . tangential connecting portion
96 . . . folded connecting portion
97 . . . retaining portion
99 . . . accommodation groove
99F . . . first groove portion
99S . . . second groove portion
A, D, E . . . connector device
B . . . first circuit board
C . . . second circuit board

What is claimed is:

1. A connector device, comprising:
a plurality of first terminal units to be mounted on a first circuit board;
a plurality of second terminal units to be mounted on a second circuit board; and
a plurality of movable terminal units,
wherein:
the first terminal unit includes a first outer conductor surrounding a first inner conductor,
the second terminal unit includes a second outer conductor surrounding a second inner conductor,
the movable terminal unit includes a movable outer conductor surrounding a movable inner conductor,
the movable terminal unit is rockable with the second terminal unit as a fulcrum,
a tip part of the movable terminal unit is connectable to the first terminal unit,
the plurality of movable outer conductors are electrically conductively connected via a connecting member,
the connecting member includes a resilient contact piece configured to resiliently contact the movable outer conductor, and
the resilient contact piece follows a movement of the movable terminal unit while being resiliently deformed when the movable terminal unit is displaced with respect to the connecting member.

2. A connector device, comprising:
a plurality of first terminal units to be mounted on a first circuit board;
a plurality of second terminal units to be mounted on a second circuit board; and
a plurality of movable terminal units,
wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, the connecting member includes a resilient contact piece configured to resiliently contact the movable outer conductor, and the resilient contact piece is cantilevered along an outer periphery of the movable outer conductor.

3. A connector device, comprising:

a plurality of first terminal units to be mounted on a first circuit board;

a plurality of second terminal units to be mounted on a second circuit board; and a plurality of movable terminal units, wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, and the connecting member includes a plurality of hole portions, the plurality of movable terminal units being individually passed through the hole portions.

4. A connector device, comprising:

a plurality of first terminal units to be mounted on a first circuit board;

a plurality of second terminal units to be mounted on a second circuit board; and a plurality of movable terminal units, wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, and the connecting member includes a contact portion configured to contact the movable terminal unit with a non-fracture surface.

5. A connector device, comprising:

a plurality of first terminal units to be mounted on a first circuit board;

a plurality of second terminal units to be mounted on a second circuit board; and a plurality of movable terminal units, wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, the plurality of second terminal units are held in a housing, and the connecting member and the housing include holding portions for holding the connecting member in a state mounted on the housing.

6. The connector device of claim 5, wherein:

the holding portion on the connecting member side and the holding portion on the housing side have facing surfaces facing each other in a direction intersecting a displacement direction of the connecting member when the movable terminal unit rocks, and the facing surface on the connecting member side and the facing surface on the housing side are kept positioned to face each other when the connecting member is in a range where a displacement is allowed.

7. A connector device, comprising:

a plurality of first terminal units to be mounted on a first circuit board;

a plurality of second terminal units to be mounted on a second circuit board; and a plurality of movable terminal units, wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, the plurality of second outer conductors are fixed to a housing, the plurality of movable outer conductors are individually in electrically conductive contact with the plurality of second outer conductors, and the connecting member is in the form of a flat plate along an arrangement direction of the second outer conductors and in electrically conductive contact with the plurality of second outer conductors.

8. A connector device, comprising:

a plurality of first terminal units to be mounted on a first circuit board;

a plurality of second terminal units to be mounted on a second circuit board; and a plurality of movable terminal units, wherein:

the first terminal unit includes a first outer conductor surrounding a first inner conductor, the second terminal unit includes a second outer conductor surrounding a second inner conductor, the movable terminal unit includes a movable outer conductor surrounding a movable inner conductor, the movable terminal unit is rockable with the second terminal unit as a fulcrum, a tip part of the movable terminal unit is connectable to the first terminal unit, the plurality of movable outer conductors are electrically conductively connected via a connecting member, the plurality of movable outer conductors are individually in electrically conductive contact with the plurality of second outer conductors, the plurality of second outer conductors constitute a single component integrated via the connecting member, the connecting member includes a folded connecting portion closely bent and arranged to cut into a clearance between two adjacent ones of the second outer conductors.

* * * * *